(12) United States Patent
Wildey

(10) Patent No.: US 6,374,877 B1
(45) Date of Patent: Apr. 23, 2002

(54) BAR SAW FELLER BUNCHER AND METHOD OF FELLING TREES

(75) Inventor: Allan J. Wildey, Paris (CA)

(73) Assignee: Timberjack Inc., Ontario (CA)

( * ) Notice: Subject to any disclaimer, the term of this patent is extended or adjusted under 35 U.S.C. 154(b) by 0 days.

(21) Appl. No.: 09/632,262

(22) Filed: Aug. 4, 2000

Related U.S. Application Data

(60) Provisional application No. 60/149,000, filed on Aug. 13, 1999.

(51) Int. Cl.⁷ ............................................. A01G 23/08
(52) U.S. Cl. ..................... 144/4.1; 144/34.1; 144/335; 144/336
(58) Field of Search ................ 144/4.1, 34.1, 144/34.5, 335, 336

(56) References Cited

U.S. PATENT DOCUMENTS

| | | | | |
|---|---|---|---|---|
| 3,102,562 A | * | 9/1963 | Horncastle | 144/4.1 |
| 3,910,326 A | * | 10/1975 | Tucek | 144/4.1 |
| 4,013,106 A | * | 3/1977 | Albright | 144/34.1 |
| 4,446,897 A | * | 5/1984 | Kurelek | 144/34.1 |
| 4,727,916 A | * | 3/1988 | Sigouin | 144/4.1 |
| 4,909,291 A | * | 3/1990 | Tremblay | 144/34.1 |
| 4,987,935 A | * | 1/1991 | Corcoran et al. | 144/4.1 |
| 5,004,026 A | * | 4/1991 | MacLennan et al. | 144/34.1 |
| 5,533,432 A | | 7/1996 | Örnberg | 83/819 |
| 6,152,201 A | * | 11/2000 | Kurelek | 144/4.1 |

OTHER PUBLICATIONS

2 Page printout of http://www.hultdins.com/felling-head.html, "Hultdins Superfell 560 &580" Admitted Prior Art.
Hultdins, foldout brochure, "Hultdins Super Cut Saw Unit Range" Admitted Prior Art.
Koehring Waterous, 4 page brochure, "Disc Saw Felling Heads" Published CFA–1M–2/99, Admitted Prior Art.
Timberjack, 1 page, "Timberjack 790 Unicon Bar Saw Grapple Head Description" Admitted Prior Art.

* cited by examiner

Primary Examiner—W Donald Bray
(74) Attorney, Agent, or Firm—Quarles & Brady LLP

(57) ABSTRACT

A bar saw felling head clamps a tree between harvesting and reaction arms during cutting and after the cut sweeps the tree rearwardly with the harvesting arm into an accumulation pocket where an accumulating arm holds it and any already cut trees. The bar saw cuts from a cocked position normal to the machine direction to a home position which is perpendicular to the cocked position, where the bar saw is housed in a protective box.

16 Claims, 6 Drawing Sheets

BAR SAW FELLER BUNCHER AND METHOD OF FELLING TREES

CROSS-REFERENCE TO RELATED APPLICATION

This claims the benefit of U.S. Provisional Patent Application No. 60/149,000 filed Aug. 13, 1999.

STATEMENT REGARDING GOVERNMENT SPONSORED RESEARCH OR DEVELOPMENT

Not Applicable.

BACKGROUND OF THE INVENTION

Feller bunchers are widely used in the logging industty for accumulating in a vertical position several freshly cut trees prior to laying down the bundle at once, to be transported to roadside by a skidder or forwarder. The feller buncher consists of a felling head mounted on a heavy-duty vehicle, such as a drive to tree or swing to tree wheeled or tracked vehicle, for high efficiency logging.

Typically, saws intended for use on feller bunchers have a large saw disc with peripheral cutting teeth. The disc is rotated in a horizontal plane below a butt plate, with the teeth exposed at the front of the butt plate. One such felling head is the Timberjack Model D567 which is the subject of U.S. patent application Ser. No. 29/088,450 filed May 22, 1998, the disclosure of which is hereby incorporated by reference. Already cut trees are supported on the butt plate and held in place by one or more articulated accumulating arms. As the blade is advanced through a tree being cut, the butt plate slides under the cut stem and the stem is stabilized by one or more harvesting arms. The method is know as "cut and catch" because the harvesting arms do not close until severance is complete. Typically, two harvesting arms are provided which move in unison, are vertically spaced apart and are hinged to the frame of the head to pivot about a vertical axis on one side of the frame. A single accumulating arm is typically provided, positioned vertically between the two harvesting arms and hinged to pivot about a vertical axis on the opposite side of the frame. When the cut is completed, for example by driving through the tree in the case of a drive to tree feller buncher, the harvesting arms are closed thus retaining the stem on the butt plate with those already accumulated in the pocket of the head and held by the accumulating arm. The accumulating arm is withdrawn from the bundle and brought back around the bundle, including the newly cut tree.

Other means of cutting trees with power operated means include a shear and a bar saw. A shear shears off a tree with a hydraulically powered scissors-like action. A bar saw uses teeth on an endless power driven chain to cut a tree, like the commonly available chain saw, but much larger. For example, the power input to a bar saw may be in excess of 100 hp.

Bar saws have been used in connection with a felling head or a harvesting head. A felling head cuts a tree and lays it down or drops it before cutting another tree. A harvesting head is a multi-function machine which fells the tree, using the bar saw, and then strips its branches and cuts metered lengths from the stem, also using the bar saw. In both the bar saw felling head and the bar saw harvesting head, harvesting arms hold the tree while it is being cut In both machines the arms exert an upward force on the stem to keep it from pinching the saw.

Bar saws have a number of advantages over disc saws. Cutting chains are relatively easy to maintain and inexpensive. The bar is also inexpensive, particularly in comparison to a saw disc, which is a large and expensive machined component The teeth for disc saws are also relatively large and expensive replacement items.

Accumulating saws have typically employed disc saws for cutting the tree, since the design of the disc was able to accommodate the butt plate to support the tree. See, for example, U.S. Pat. No. 5,377,731, the disclosure of which is hereby incorporated by reference. A bar saw is relatively fragile and vulnerable to damage, particularly in comparison to a disc saw, and what to do with the bar saw during accumulation and transport has been a problem. The bar must at all times be protected from the environment, and from the tree while the tree is being moved into the accumulating area, and also while laid down or dropped.

SUMMARY OF THE INVENTION

The present invention provides a bar saw accumulating head in which a bar saw and an accumulating head are combined. The bar saw cuts off the stem, and harvesting and accumulating arms move it onto a butt plate and hold it supported on the butt plate.

In one aspect, the tree being cut is clamped between a harvesting arm and a reaction arm, which support the tree while it is being cut. This clamping also enables the application of an upward force on the tree which keeps it from pinching the saw bar. After the stem is cut from the stump, the harvesting arm slides the stem over the top of the stump and from the stump onto a butt plate, while the reaction arm is relieved so as to move out of the way. The butt plate may be ramped upwardly, so that as the stem is slid back over it, the stem is elevated and biased to tip forward. After the newly cut stem is slid rearwardly by the harvesting arm, the accumulating arm is withdrawn from the already accumulated bundle and brought back around to re-secure the bundle including the newly cut stem The machine is ready to cut a new tree after the bar is swung from the home position back into the cocked position.

In another aspect, cutting is begun with the bar saw in the cocked position in which it is at the front of the butt plate and generally perpendicular to the machine direction. The chain is driven and the bar is pivoted through the tree, with the head held generally stationary. Pivoting may be through an angle of approximately 90°, to a home position. In the home position, the bar is generally parallel to the machine direction. Preferably, the bar is housed in a box in the home position, with the inner side of the box open. The bar is kept in the home position at all times, except just prior to commencing and during a cut. After the cut is made, the bar is parked in the home position where it is well protected, until just prior to the next cut. In conventional bar saws, the saw bar is typically returned to its starting position by retracting it through the kerf, which increases the chance for damage.

These and other objects and advantages of the invention will be apparent from the detailed description and drawings.

DETAILED DESCRIPTION OF THE PREFERRED EMBODIMENTS

Figure 1:
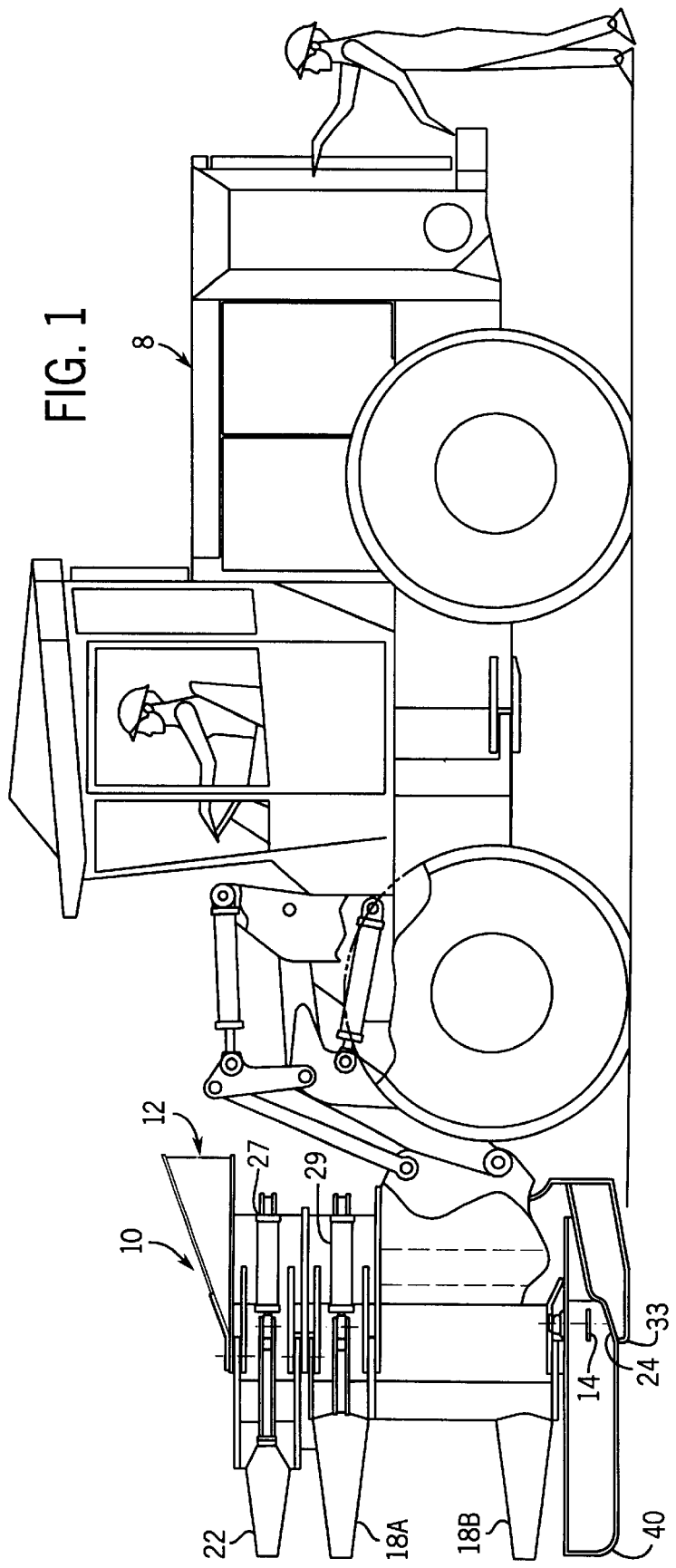
FIG. 1 is a side schematic view illustrating a bar saw felling head in accordance with the invention mounted on the front of a drive-to-tree machine.

Referring to the drawings, a bar saw felling head 10 of the invention mounted to a vehicle 8 in conventional manner includes a frame 12, a bar saw 14 and a hydraulic motor 16 (FIG. 5) which drives the cutting chain of the bar saw 14. The frame 12 mounts a harvesting arm 18 having a pair of vertically spaced apart harvesting arm tines 18A, 18B which pivot together about generally vertical axis 19 with operation of hydraulic actuator 29. A reaction arm 20 is pivotally mounted on the side of the frame 12 opposite from the arm 18 to pivot about the generally vertical axis of post 21 by operation of hydraulic actuator 31. An accumulating arm 22 is pivoted to the same side of the frame 12 as the harvesting arm 18. Because of the way the pivot axes of the arms 18 and 20 are arranged, the arms 18 and 20 are pivoted in the same direction (clockwise as viewed from above) when they are moved to their closed positions to hold a tree.

Figure 5:
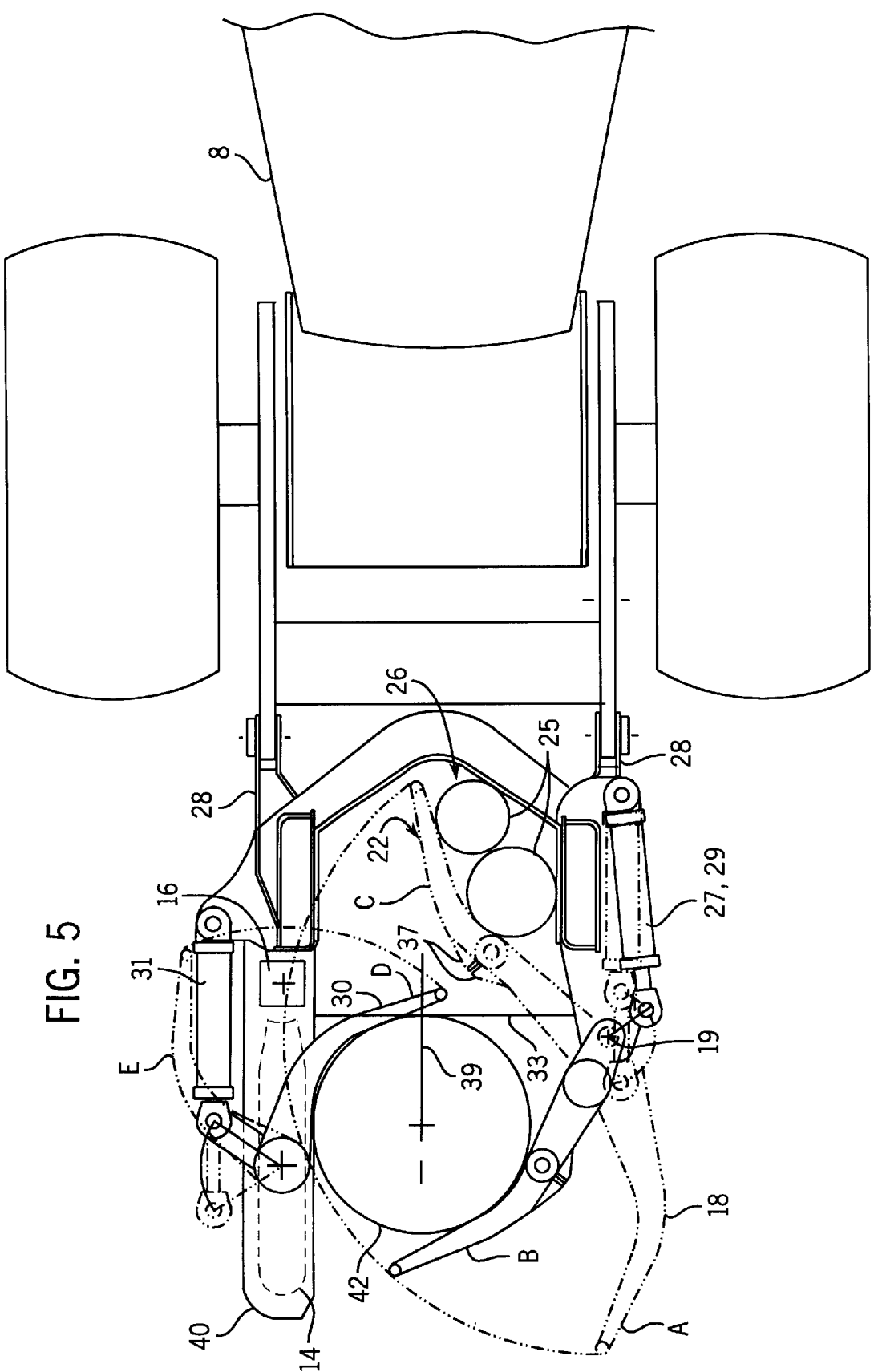
FIG. 5 is a top plan schematic view of the head attached to a drive-to-tree machine with the arms in different positions.

The accumulating arm 22 includes an outer arm 22A and an inner arm 22B made up of two links which are pivotally mounted at one end to the frame 12 and at the other end to the outer arm 22A to pivot about generally vertical axes. The outer arm 22A extends rearwardly beyond the inner arm 22B to be pivotally connected to a hydraulic actuator 27 to enable the arm 22 to be withdrawn from a bundle of collected trees and brought back around the bundle including a newly cut tree. As schematically illustrated in FIG. 5, the arm 22 may include stops 37 so that the outer arm 22A can be rotated in only one direction (clockwise as viewed from the top) relative to the inner arm 22B from the fully open position, as is well known in accumulating arm constructions. Any suitable accumulating arm construction may be used to practice the present invention.

Thus, all of the arms 18A, 18B, 20 and 22 pivot in a plane which is generally perpendicular to the longitudinal axis of the head 10, which in the normal orientation of the head 10 for cutting trees is a generally horizontal plane. The arm 20 may be above, even with arm 18A (as illustrated, so they move in a common plane of motion), or between arms 18A and 18B.

Figure 1A:
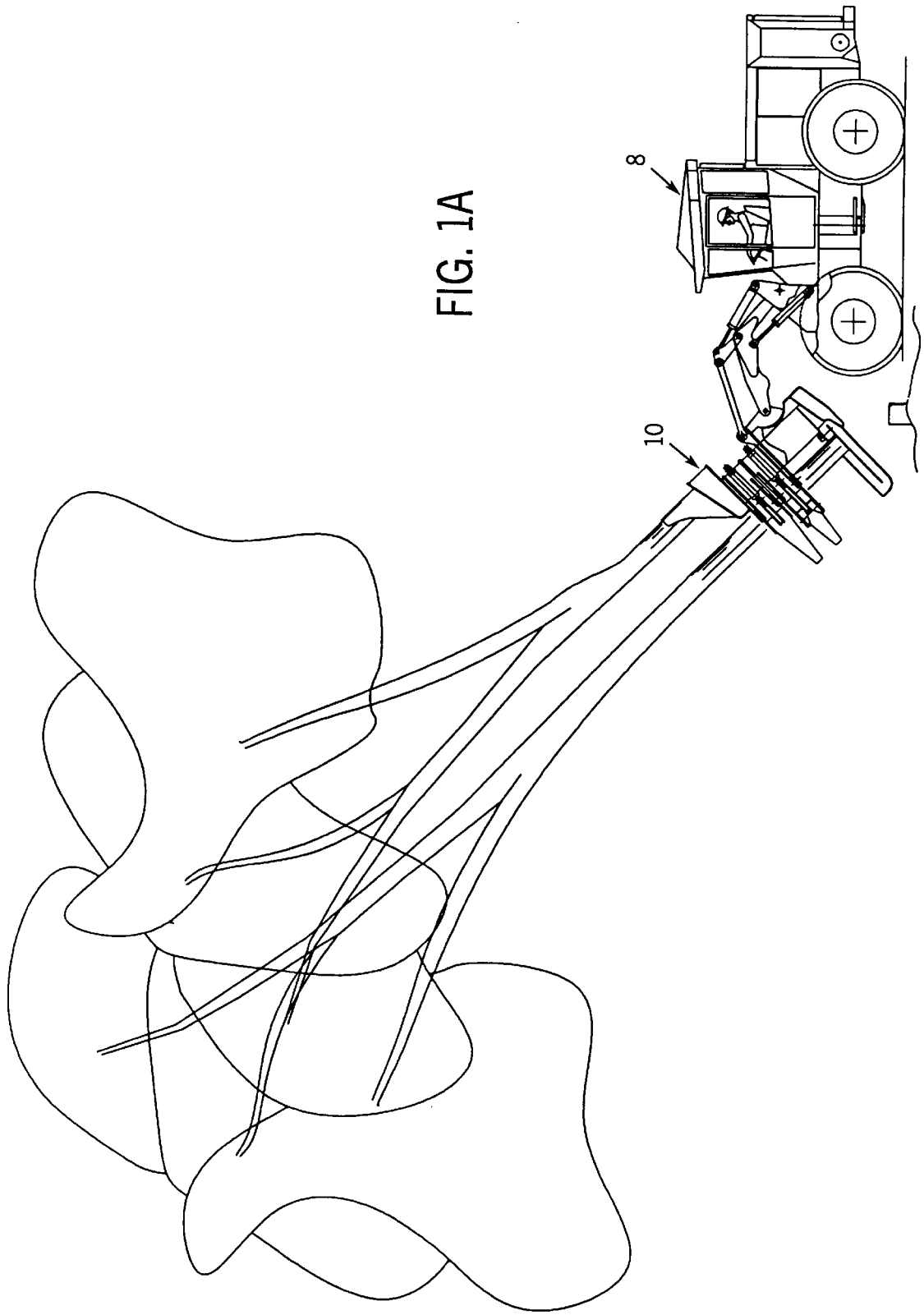
FIG. 1A is a view like FIG. 1, but illustrating a bundle of trees being dumped from the head.

The frame 12 also includes a ramped butt plate 24, which has a front tree abutment edge 33 (FIG. 1) below the level of the bar saw 14 and extends rearwardly to provide the floor of the accumulation pocket 26 (FIG. 5), which is above the rearward portion of the butt plate 24 and is the area in which cut trees 25 are held by the accumulating arm 22 after being cut and prior to dumping. Brackets 28 extend rearwardly from the frame 12 for mounting the head to the front of the vehicle 8, which mounting enables the head 10 to be tipped forward so as to dump trees as shown in FIG. 1A.

The vehicle 8 in the illustrated embodiment is a drive-to-tree feller buncher. The head 10 could also be mounted on a swing to tree feller buncher, in which case it could be provided with a rotary coupling for mounting it to the front of a boom carried by the vehicle, as well known in the art.

The frame 12 also includes a stabilizing structure 27, which guides trees into the pocket 26 and cradles them as they are held by the accumulating arm 22 in the pocket 26. The structure 27 may extend all of the way down to the butt plate 24 but need not, any structure capable of guiding and securing the cut trees as they are raked into and held in the pocket 26 being suitable for practicing the invention.

Figure 2:
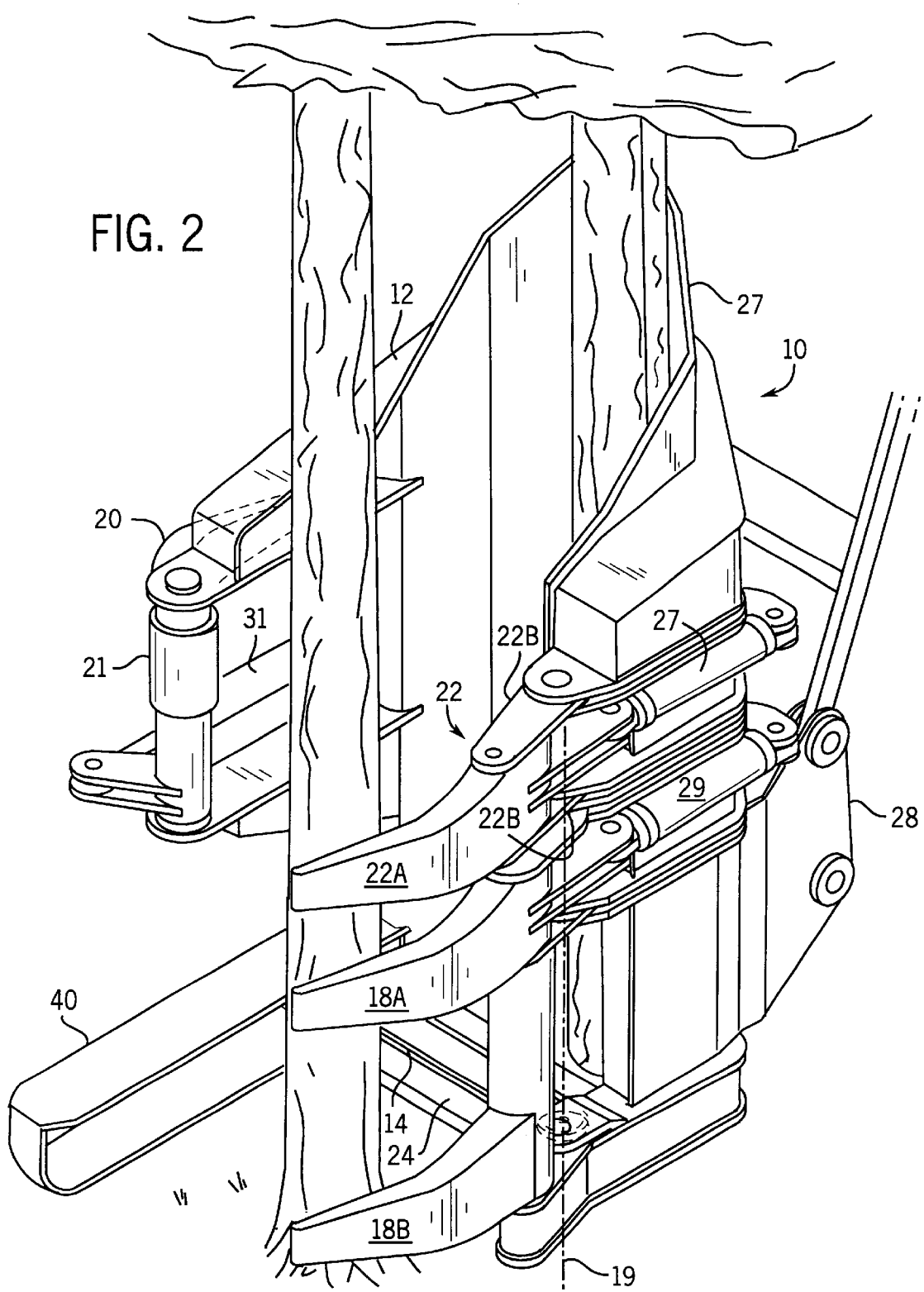
FIG. 2 is a front perspective schematic view of the head approaching the first tree of a bundle to be accumulated.

The arms 18, 20 and 22 are all pivotally connected to the frame 12 and hydraulically operated by hydraulic cylinders 27, 29, 31 or other suitable high force actuators or other devices. The harvesting arm 18 and the accumulating arm 22 are pivotally connected along the left side of the head 10 to pivot in horizontal planes, and the reaction arm 20 is pivotally connected on the right side of the head 10 to pivot in a horizontal plane. The accumulating arm 22 has two sections which are pivotable relative to one another as explained above and the harvesting arm 18 and arm 22 are pivotable through a relatively large range of motion, both being openable to the open position A shown in FIG. 5 (also FIG. 2) and all the way back to the closed position C of FIG. 5 in which the harvesting arms 18A, 18B, and the accumulating arm 22 for the first tree cut, sweep the cut trees into the pocket 26. Both arms 18 and 22 can also be stopped anywhere in between the fully open and fully closed positions at an intermediate cutting position B, in which they clamp a tree being cut against the reaction arm 20, in its forward cutting position D, and the tree abutment edge 33. Note that reaction arm 20 is either open or closed and has no intermediate position.

After the first tree is cut, the accumulating arm 22 stays in the swept position C to hold the trees in the pocket 26, and the harvesting arm 18 is opened to position A for the next tree. The reaction arm 20 is pivotable between the forward cutting position D, in which it and the harvesting arms 18 hold a tree in front of the butt plate 24, with the edge 33 abutting the base of the tree below the bar saw 14, and a rearward released position E in which the arm 20 is rotated back out of the way of the tree when it is being swept back into the pocket by the harvesting arm 18 (and accumulating arm 22 for the first tree cut). As explained above, for second and subsequent trees, when the harvesting arm sweeps a newly cut tree back into the pocket 26, the accumulating arm 22 articulates to withdraw from between the newly cut tree and the already accumulated bundle, to add the newly cut tree to the bundle being held by it It is also noted that more than one accumulating arm could be provided, for example two of them vertically spaced apart, which may be desirable for securing larger trees.

Figure 3:
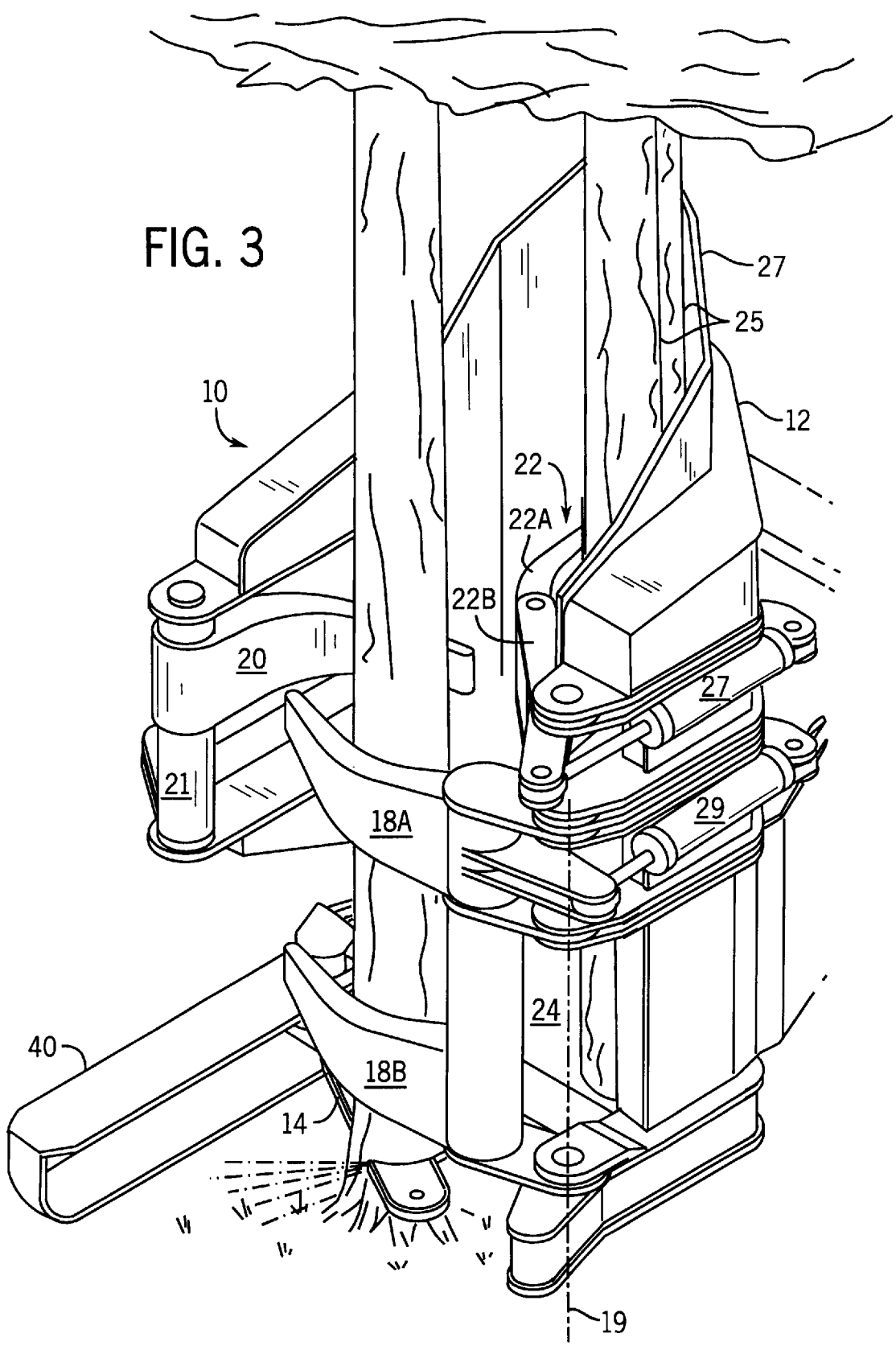
FIG. 3 is a view similar to FIG. 2, but illustrating cut trees held by the accumulating arm and a subsequent tree clamped by the harvesting and reaction arms and being cut by the bar saw.

The bar saw 14 includes a saw bar and a cutting chain which is driven by motor 16 around the periphery of the saw bar in well known fashion. The bar saw 14 is pivoted so that it can be pivoted between the cocked position (FIG. 3), which is 90° to the machine direction 39 and the home position (FIG. 2), which is parallel to the machine direction, for example by a hydraulic cylinder (not shown). A saw bar, cutting chain and hydraulically operated mechanism for moving the bar saw through 90° is known, for example, from the Timberjack 790 Unicon Bar Saw Grapple Head, and such mechanisms are commercially available such as the SuperCut™ from Hultdins Inc., Brantford, Ontario, Canada. Any suitable mechanisms may be used for driving the chain of the bar saw and pivoting it between its home and cocked positions, for example, a rotary or linear hydraulic actuator which may rotate the saw about the axis of the chain drive motor or a different axis. Also as well known, it is preferable to provide a chain lubrication mechanism, which lubricates the chain while it is running. The Hultdins SuperCut™, for example, includes built in proportional chain lubrication.

Figure 4:
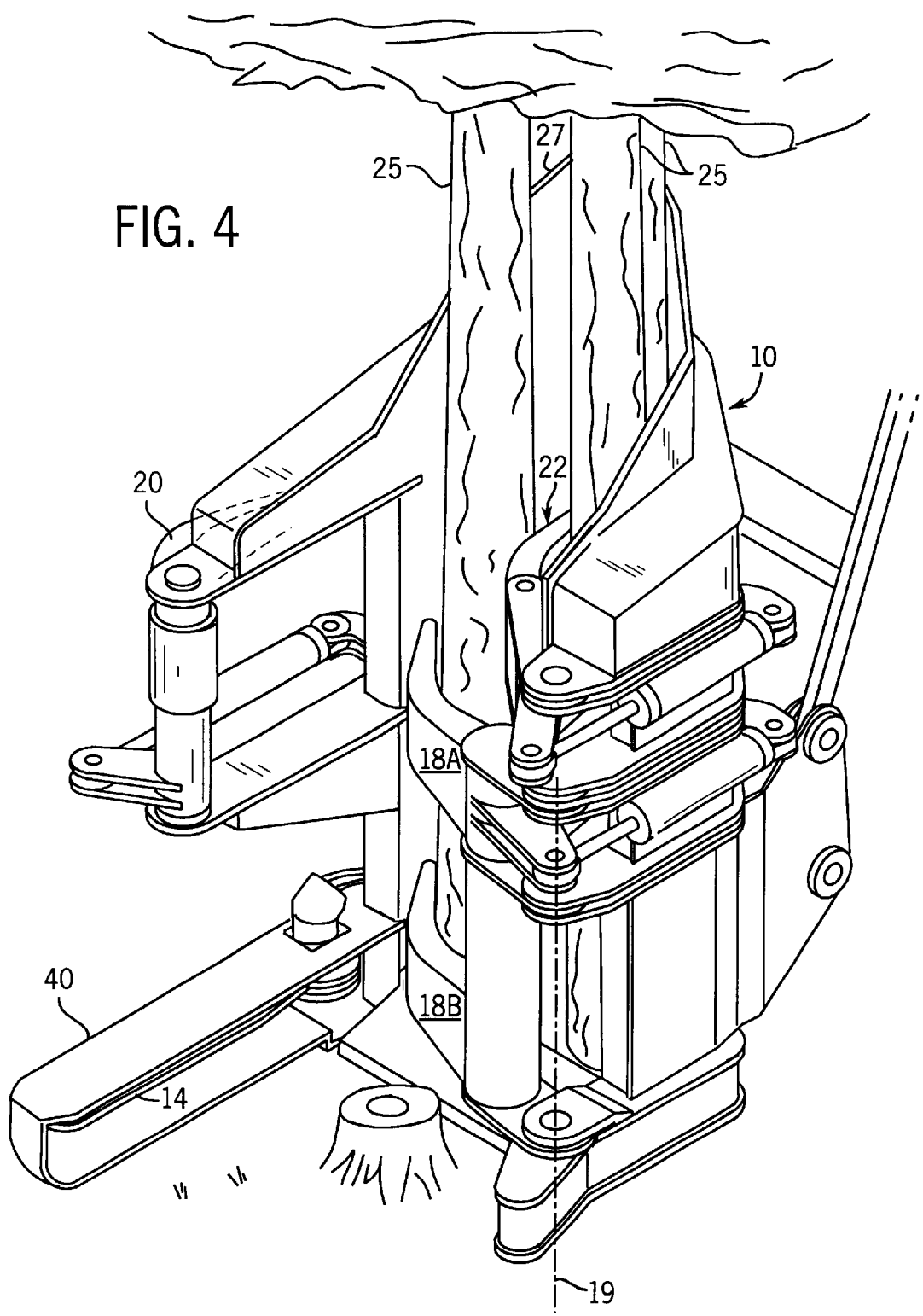
FIG. 4 is a view similar to FIG. 3 with the cut finished and the newly cut tree being moved on the butt plate by the harvesting arms, with the accumulating arm between the newly cut tree and the existing bundle.

The normal, at rest, position of the bar saw 14 is the home position of FIG. 4, in which the bar saw 14 is housed in box 40 which is open on its side facing inwardly, i.e., toward the tree being cut, so as to receive the bar saw 14 after it cuts through a tree. The box 40 is of heavy duty construction, e.g., ⅜" to ⅝" welded steel, and is welded to and forms part of the frame 12, to protect the bar saw 14 when it is not cutting, and particularly when dumping trees.

In preparation for cutting a tree, and prior to moving the head so as to position the tree in the cutting position as illustrated by circle 42 (FIG. 5, indicating the largest diameter tree that can be cut), the bar saw 14 is moved to the cocked position (FIG. 2), which is above and rearward of the abutment edge 33 of the butt plate 24. When moved from the home position to the cocked position, the chain is preferably driven so as to clear branches and debris from the area of the saw 14. Also, the harvesting arm 18 (and accumulating arm 22 for the first tree) is moved to its open or released position A. The tree is then approached and abutted against the edge 33. The reaction arm 20 is closed position D) either before or after abutment of the tree against edge 33, and the arm 18 (and arm 22 for the first tree) are then closed to the cutting position (position B) against the tree. The arms 18 and 20 may be provided with edges which engage the tree trunk so that the arms 18 and 20 can exert a lifting force on the tree trunk as the tree is being cut, so that the tree trunk does not pinch the bar saw in the kerf. Such edges can be provided, for example, by making the arms 18 and 20 of steel plates welded together, with the vertical plate of each arm (the plate that faces the tree) recessed slightly from the edges of the upper and lower horizontal plates so that the edges of the upper and lower plates of the arms bite into the tree to prevent vertical slipping of the tree relative to the arms.

Exerting a lifting force during cutting is known in prior bar saws, such as the Timberjack Unicon 790, referred to above. The lifting force can be provided either by exerting a lifting force on the entire head by operating the mechanism which mounts the head 10 to the vehicle 8, or by mounting the arms 18 and 20 so that vertical lifting forces can be applied to them, so as to raise them up relative to the bar saw 14.

In prior bar saws, the tree was held between sets of clamp or harvesting arms and stationary parts of the frame of the felling head. That is not the case in the feller buncher 10, in which one or more reaction arms 20 are provided opposite from the harvesting arms 18, to react against the harvesting arms 18 and thereby hold the tree while it is being cut.

Once the tree is engaged between the arm 18 and the arm 20 and edge 33, the lifting force is applied, the chain of the bar saw 14 is driven and the chain lubricator, typically provided as part of a standard bar saw, is automatically activated. The bar 14 is swung outwardly to cut the tree off from the stump. After the tree is completely severed, the bar saw is parked in the box 40 in the home position, with the chain (and lubricator) turned off. As such, the bar saw 14 does not impede the path to the accumulating pocket and the bar saw does not go back through the kerf to return home. Pressure on the reaction arm 20 is relaxed, and the cut stem may be permitted to rest on the stump momentarily while the harvesting arm 18 (and optionally arm 22 if it's the first tree of a bundle) are operated to push the stem back across the stump and onto the butt plate 24, which slopes upwardly from a level at its front which is below the bar saw 14 and therefore below the kerf. The harvesting arm 18 (and optionally arm 22 if it is the first tree of a bundle) continue pushing the stem into the pocket 26, against the structure 27. If the tree is the second or subsequent tree of a bundle, the arm 18 pushes the tree back against the front side of the accumulating arm 22 and the accumulating arm 22 is cycled to withdraw and come back around the entire bundle of stems, including the newly cut one. The harvesting arm 18 is then returned to the open position, as is the reaction arm 20, to be ready to cut another tree. If there are no stems already accumulated, then the harvesting arm 18 and accumulating arm 22 move the stem into the pocket 26, the accumulating arm 22 is kept closed, and only the harvesting arm 18 is reopened. Alternatively, the accumulating arm 22 can be kept open (position A) while cutting and sweeping the first tree of a bundle into the pocket 26, and only closed after the tree is swept into the pocket, before the harvesting arm 18 is reopened.

When the capacity of cut stems is reached, the accumulating and harvesting arms are released (to position A) and the load is dropped (FIG. 1A), to be loaded on a truck or transporter or skidded out of the forest.

A preferred embodiment of the invention has been described in considerable detail. Many modifications and variations will be apparent to those skilled in the art. For example, the reaction arm and/or accumulating arm may have more than one tine, or the harvesting arm could have only one tine or more than two tines. Also, the particular pivot locations of the arms could be varied from that disclosed, although the pivot locations disclosed are preferred for efficient and effective operation of the head, handling a wide variety of tree diameters, and having a relatively large accumulation pocket. Therefore, the invention should not be limited to the embodiment described, but should be defined by the claims which follow.

I claim:

1. In a bar saw felling head having arms for holding a tree while it is being cut and a bar saw having a cutting chain which is driven to cut said tree, the improvement wherein said tree is clamped between a moveable harvesting arm on one side of said tree and a moveable reaction arm on an opposite side of said tree while said tree is being cut and said head further includes an accumulating arm for holding cut trees in an accumulation pocket of said head.

2. The improvement of claim 1, wherein said head further comprises a butt plate for supporting trees in said accumulation pocket.

3. In a bar saw felling head having arms for holding a tree while it is being cut and a bar saw having a cutting chain which is driven to cut said tree, the improvement wherein said tree is clamped between a moveable harvesting arm on one side of said tree and a moveable reaction arm on an opposite side of said tree while said tree is being cut and said head has a tree abutment edge which abuts said tree on said opposite side of said tree while said tree is being cut.

4. The improvement of claim 3, wherein said tree abutment edge is below and in front of said bar saw when said bar saw is in a cocked position prior to cutting said tree.

5. The improvement of claim 4, further comprising a butt plate, and wherein said tree abutment edge is a forward edge of said butt plate, said butt plate sloping upwardly from said tree abutment edge so as to support cut trees on said butt plate and elevate said trees as they are swept rearwardly over said butt plate by said harvesting arms.

6. In a bar saw felling head having arms for holding a tree while it is being cut and a bar saw having a cutting chain which is driven to cut said tree, the improvement wherein said tree is clamped between a moveable harvesting arm on one side of said tree and a moveable reaction arm on an opposite side of said tree while said tree is being cut and said harvesting arm is pivotally connected to a frame of said head on one side of said head and said reaction arm is pivotally connected to said frame on an opposite side of said head.

7. The improvement of claim 6, wherein said head further includes an accumulating arm for holding cut trees in an accumulation pocket of said head.

8. The improvement of claim 7, wherein said accumulating arm is pivotally connected to said frame on said one side of said head.

9. In a bar saw felling head having arms for holding a tree while it is being cut and a bar saw having a cutting chain which is driven to cut said tree, the improvement wherein said tree is clamped between a moveable harvesting arm on one side of said tree and a moveable reaction arm on an opposite side of said tree while said tree is being cut and said bar saw starts cutting said tree from a cocked position in which said bar saw extends at 90° to said machine direction.

10. The improvement of claim 9, wherein said bar saw returns to a home position after cutting through said tree, said home position being at approximately 90° to said cocked position.

11. In a bar saw felling head having arms for holding a tree while it is being cut and a bar saw having a cutting chain which is driven to cut said tree, the improvement wherein said tree is clamped between a moveable harvesting arm on one side of said tree and a moveable reaction arm on an opposite side of said tree while said tree is being cut and said bar saw is housed in a protective box in the home position.

12. In a bar saw felling head having arms for holding a tree while it is being cut and a bar saw having a cutting chain which is driven to cut said tree, the improvement wherein said tree is clamped between a moveable harvesting arm on one side of said tree and a moveable reaction arm on an opposite side of said tree while said tree is being cut and each of said arms is pivotally mounted to one or the other side of said head to pivot about a pivot axis on the respective side, and wherein said pivot axes are positioned such that said arms rotate in the same direction about their respective pivot axes when said arms are closed to hold a tree.

13. A method of harvesting trees with a bar saw felling head having a bar saw with a driven cutting chain, comprising:

clamping said tree between a moveable harvesting arm and a moveable reaction arm;

cutting said tree by driving said chain while moving said bar saw through said tree;

operating said harvesting arm to sweep said tree rearwardly into a cutting pocket of said head while said reaction arm moves out of the way; and holding said tree in said accumulating pocket with an accumulating arm.

14. A method of harvesting trees with a bar saw felling head having a bar saw with a driven cutting chain, comprising:

clamping said tree between a moveable harvesting arm and a moveable reaction arm;

cutting said tree by driving said chain while moving said bar saw through said tree; and operating said harvesting arm to sweep said tree rearwardly into a cutting pocket of said head while said reaction arm moves out of the way;

wherein during said cutting step said harvesting and reaction arms exert an upward force on said tree.

15. A method of harvesting trees with a bar saw felling head having a bar saw with a driven cutting chain, comprising:

clamping said tree between a moveable harvesting arm and a moveable reaction arm;

cutting said tree by driving said chain while moving said bar saw through said tree; and operating said harvesting arm to sweep said tree rearwardly into a cutting pocket of said head while said reaction arm moves out of the way;

wherein during said cutting step said bar saw is moved through said tree from a cocked position in which said bar saw extends substantially perpendicular to a machine direction which is the direction of normal straight-line motion of said head and a home position which is substantially parallel to said machine direction.

16. The method of claim 15, wherein said bar saw is maintained in said home position while said trees are swept into said cutting pocket by said harvesting.

\* \* \* \* \*